F. N. MASON.
ELECTRIC BATTERY.
APPLICATION FILED OCT. 25, 1913.
1,149,665.
Patented Aug. 10, 1915.
4 SHEETS—SHEET 2.
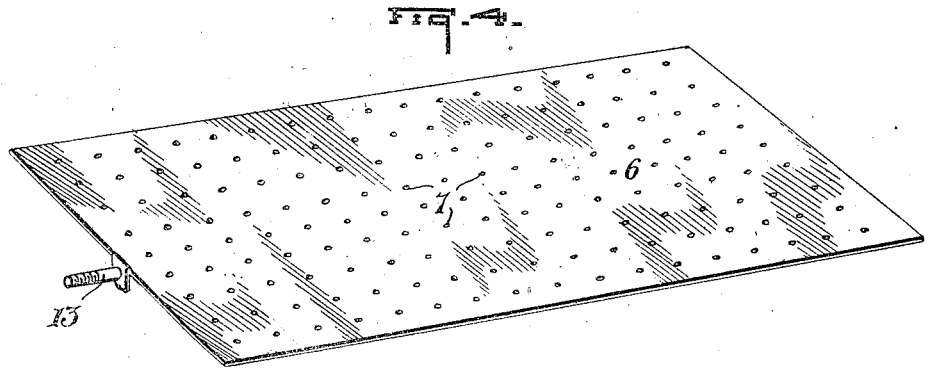
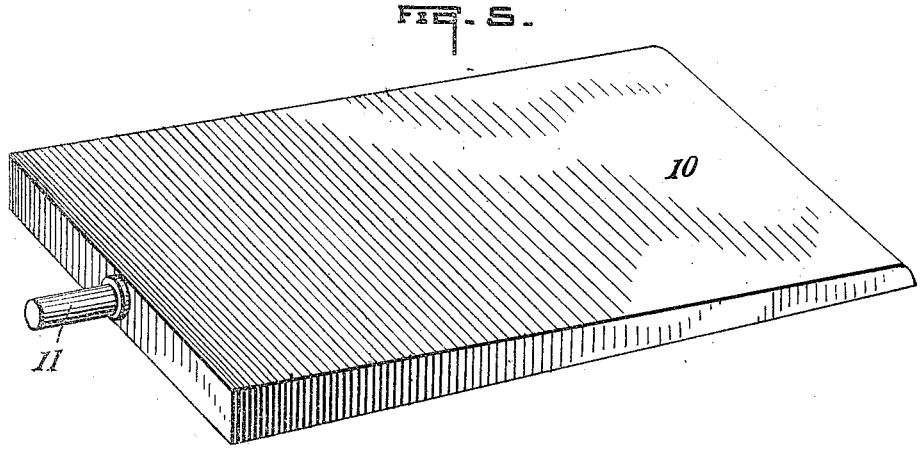
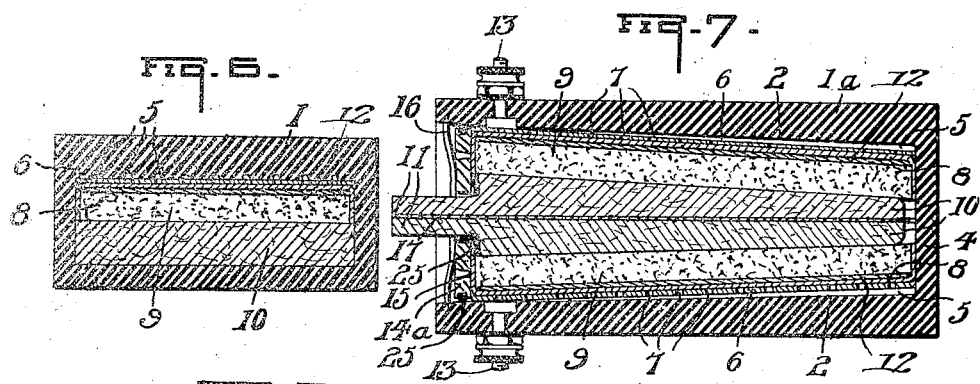
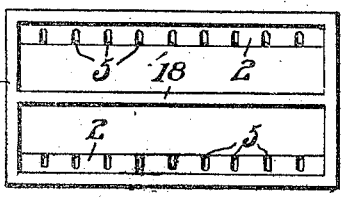
WITNESSES
INVENTOR
F. N. Mason
By F. N. Barber
ATTORNEY

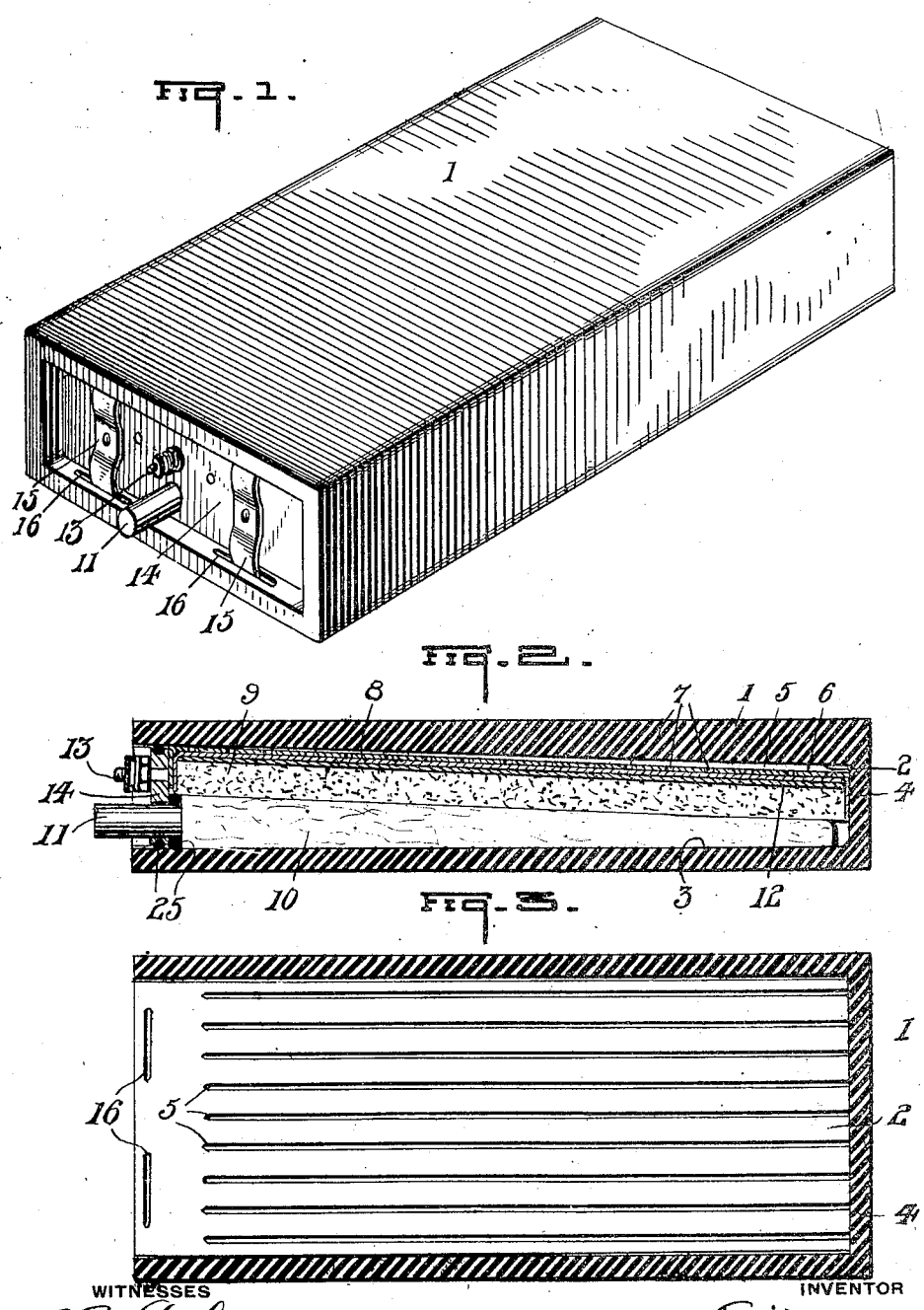

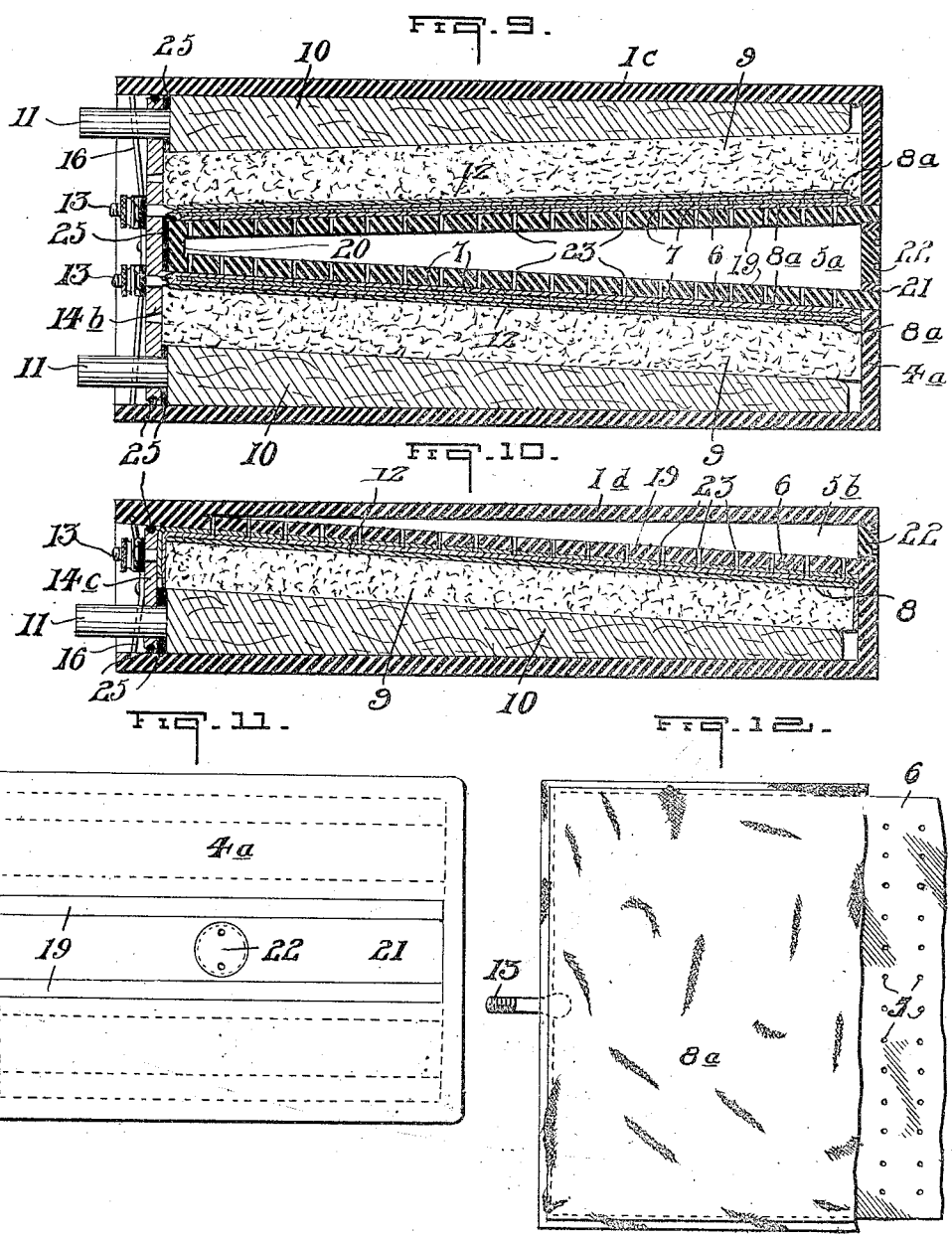

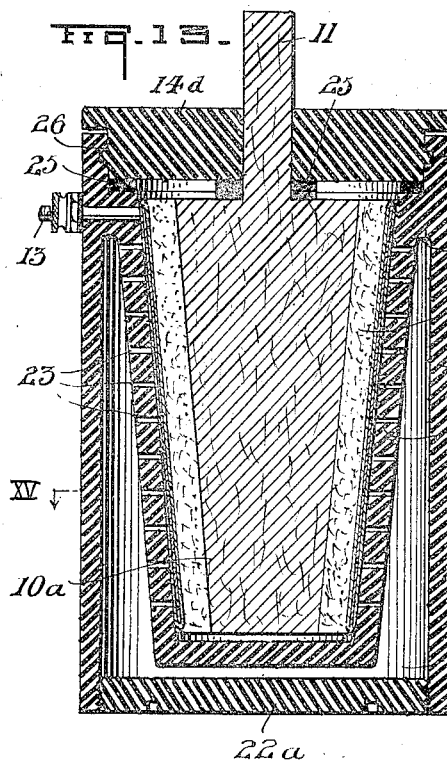
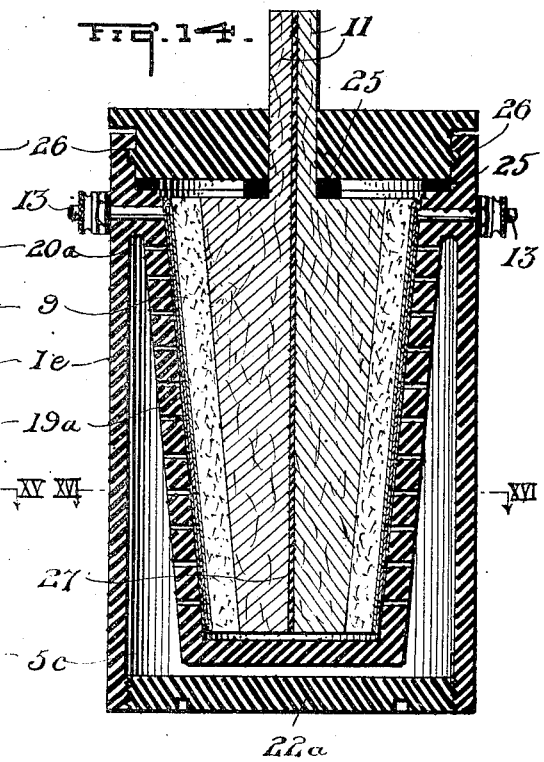
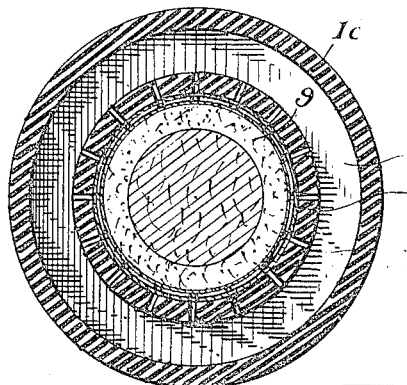
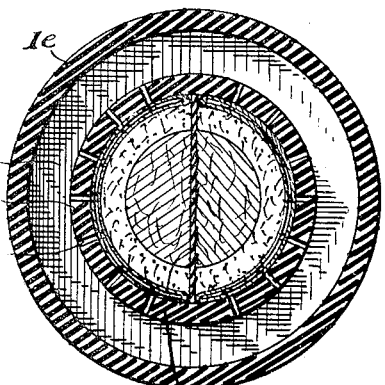
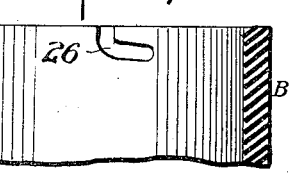

UNITED STATES PATENT OFFICE.

FRANK N. MASON, OF PITTSBURGH, PENNSYLVANIA.

ELECTRIC BATTERY.

1,149,665. Specification of Letters Patent. Patented Aug. 10, 1915.

Application filed October 25, 1913. Serial No. 797,219.

*To all whom it may concern:*

Be it known that I, FRANK N. MASON, a citizen of the United States, residing at Pittsburgh, in the county of Allegheny and State of Pennsylvania, have invented new and useful Improvements in Electric Batteries, of which the following is a specification.

My invention relates to electric batteries of the so-called dry cell type.

The objects of my invention are to provide improved means for moistening prepared dry cakes of depolarizing material, for tightly wedging or compressing the said cake; and for preventing the corrosion of the positive plate before its insertion in the casing.

Other objects will appear hereinafter.

Referring to the accompanying drawings, Figure 1 is a perspective view of one form of my invention; Fig. 2, a longitudinal section of Fig. 1; Fig. 3, a longitudinal section of the casing; Fig. 4, a perspective view of the positive or zinc plate; Fig. 5, a perspective view of the wedge 10; Fig. 6, a transverse section of Fig. 2; Fig. 7, a section of a double battery with a pair of carbon wedges separating the two layers of active material; Fig. 8, a plan view of a casing for a two-cell battery; Fig. 9, a longitudinal section of another form of my invention; Fig. 10, a similar view of a still different form thereof; Fig. 11, a bottom plan view of Fig. 9; Fig. 12, a side view, partly broken away, showing the positive or zinc plate and its envelop; Figs. 13 and 14, respectively, vertical and horizontal sections of another form of my invention; Figs. 15 and 16, similar views of a still different form thereof, the sections being taken on the lines XV—XV, XVI—XVI of Figs. 13 and 14, respectively; and Fig. 17, a vertical section of the top of the casing.

Referring first to Figs. 1 to 6 of the drawings, 1 represents the casing composed preferably of a non-conductor of electricity, such as, vulcanite. At least one of the inner surfaces of the casing, for example, the lateral surface 2, approaches the opposite surface, as 3, from the top to the bottom, causing the space in the casing to be wedge-shaped with the narrower end at the bottom 4. The said surface 2, having therein a number of grooves 5, serves as a well or means for storing water for a purpose to be explained presently. These grooves may be variously arranged and shaped. On the surface 2 I place the positive element or plate 6 which is preferably a sheet of zinc provided with openings 7 shown to be round, but it is to be understood that they may be variously shaped, since they are merely for the purpose of affording passages for the water in the grooved surface or well 5. On the positive element 6 I place the porous paper or other suitable material 8, which is, preferably for convenience, composed of a single sheet. On the sheet 8 I place the depolarizing material 9, which may be composed of any of the well-known or other ingredients suitable for the purpose. These ingredients are preferably mixed outside the casing 1 and compressed into a cake preferably having the length and width of the zinc sheet 6 or the paper sheet 8. Preferably the cake will be of uniform thickness and its sides will be flat and even, its thickness being such as to furnish the desired quantity of the depolarizing material and permit the wedge 10 to be inserted between itself and the surface 3. This wedge is the negative element and is preferably composed of carbon. It has the terminal 11 extending beyond the casing 1. The cake of material 9 is preferably coated with a layer 12 of electrolyte paste on one side, which, in assembling the contents of the cell, is placed next to the sheet 8. After the cake has been formed and coated substantially as described, it is put into a drier, oven, or room and slowly and thoroughly dried. When the cake has been so dried, it is put into a tight moisture-proof envelop unless it is to be immediately placed in the casing 1. Before the parts are assembled as herein specified, the grooves 5 are supplied with water, which passes through the openings 7 in the zinc sheet 6 and the paper sheet 8 and moistens the material 9. The cake might be moistened otherwise without departing from the scope of some of my claims. As will be readily understood by those conversant with the art to which my invention belongs, fluid resulting from the absorption of the water by the cake passes through the sheet 8 and into contact with the sheet of zinc 6 which it attacks, causing a current of electricity to flow from the carbon terminal 11 to the zinc terminal 13, provided these terminals are connected by a suitable conductor of electricity. The sheet 8 keeps the material 9 from direct contact with the zinc and prevents local or short-circuits in the cell, and at the same time allows the excitant to be strained therethrough into contact with the zinc. 14 is a cover removably secured in the casing by the engagement of the rotary fasteners 15 in the notches 16 in the casing wall. The terminals 11 and 13 project outwardly beyond the cover.

Referring now to Fig. 7 the construction is the same as that already described except that the internal parts are duplicated and reversely arranged with respect to the two inner surfaces 2 of the casing $1^a$. The opposing surfaces 2 converge toward the bottom and each surface has thereon a porous sheet 8; each sheet 8 has thereon a depolarizing cake 9, and each cake 9 has thereon a carbon wedge 10, the wedges being separated by the non-conductive spacer 17 and being preferably of rubber which extends out beyond all sides, forming a moisture tight seal between the cells. This construction provides a double cell in a single casing with the addition of the separator 17 which may be omitted if the zinc plates are to be connected in multiple.

In Fig. 8, I provide a casing $1^b$ which has the partition 18 so that the two cells can be provided without the temporary separator 17.

Referring to Figs. 9, 11, and 12, the casing $1^c$ has its sides preferably parallel and opposite the inner face of each wall is the inclined wall 19 extending from the under side of the cover $14^b$ to the bottom of the casing to which it is vulcanized or otherwise water-tight, each wall 19 being inclined downwardly toward the adjacent casing wall, so as to form in the casing two wedge-shaped cells with their inner ends the narrower. The ends of the walls 19 are connected by the transverse wall 20 and their opposite ends by the wall 21, vulcanized or otherwise made water-tight with the casing-walls and the walls 19. The walls 19, 20, and 21 are made separately from the casing 1 for convenience merely of manufacturing, but this manner of construction is not essential. The bottom wall 21 is provided with the removable plug 22 of the same material as the casing, and the walls 19 are provided with openings 23 which extend transversely entirely through them. The space inclosed within the walls 19, 20, and 21 and the adjacent end portions of the casing $1^c$ constitute the well $5^a$ for water. The zinc element 6 is sealed in the absorbent paper or similar envelop $8^a$ which may take the place of the sheet 8 in Figs. 2, 6, and 7, if preferred. A cake 9 is laid on each envelop and a wedge 9 is forced between each cake and the casing wall adjacent thereto. The envelop prevents the corrosion of the plate 6 by contact with moisture, air, or other substance. By using the envelops the zinc plates may be kept bright indefinitely so that a maximum of efficiency may be had when they are inserted as parts of cell contents. It is always advisable to clean the surfaces of exposed zinc plates before using them, as their corrosion resists the attack of the electrolytic fluid. The well $5^a$ is filled with water which passes through the registering openings 23 and 7 and the envelops 24 to the cakes 9. When sufficient water has been absorbed by the cakes, the remainder of the water may be poured out, leaving a space in which the gases generated in the cells may accumulate. The plug 22 may be left out to permit the gases to escape from the well.

In Fig. 10, the parts are as in Fig. 9 except the casing $1^d$ has but one cell, the well $5^b$ being formed between the wall 19 and the adjacent side of the casing. In Fig. 10 I employ the sheet 8, but the envelop $8^a$ may be used in this figure or in place of the sheet 8 in all forms of my invention.

In Figs. 13 and 15 the casing, the zinc element, the depolarizing element and the carbon element are all circular in cross-section. The downwardly tapering circular wall $19^a$ is connected to the casing at the top by the web $20^a$ and spaced from the casing to form the well $5^c$ which is closed at the bottom by the plug $22^a$. The carbon $10^a$ is a truncated cone and is pushed down into the tapering space inclosed by the material and causes the chemical elements of the cell to be brought into intimate contact. The cap $14^d$ is provided with the lugs 26 which coöperate with the bayonet slot shown in Fig. 17 to lock the cover to the casing. As in all the forms of my invention the cover engages the gaskets 25 to prevent the passage of moisture beyond them but do not transmit pressure to the carbon element.

The invention shown in Figs. 14 and 15 differs from that shown in Figs. 13 and 15 in having the contents of the cell divided by the transverse vertical partition 27 into lateral halves or cells, each cell having the separate terminals 11 and 13. As in the forms of the invention shown in Figs. 9 and 10, the depolarizing material 9 is preferably put into the casing in a dried compressed condition and the contents of the cell sealed by properly closing the cover. The well is then supplied with water to sufficiently moisten the material 9. The residue of the water is then drained off and the plug $22^a$ inserted.

I have not herein given any formula for the material 9 since a number of formulæ are known for material which when moistened will react in conjunction with the zinc element to generate an electric current. The ingredients and proportions thereof in the said material may be as follows: carbon 9 oz., manganese dioxid 8 oz., sal ammoniac 1¾ oz., and zinc chlorid 1 oz.

In all forms of my invention I have provided rubber gaskets or packing 25 of various forms between the cover 14ᶜ and parts adjacent thereto to prevent the escape of moisture from the cell or cells.

When the ingredients of my battery become exhausted, the cover is removed, and the contents of the casing taken out. A fresh paper sheet or sheets 8, and a fresh zinc sheet or sheets, or a fresh paper-enveloped zinc sheet or sheets together with one or more fresh cakes 9, which have been removed from their envelops, are put into the casing and tightly compressed by the carbon wedges. After this the covers are inserted and secured in place. Moisture will be supplied to the cakes as hereinbefore described.

In practice the pairs of zinc plates and the cakes 9 will be wrapped together in a moisture-proof covering, the plates and cakes being preferably separately sealed in moisture-proof containers.

I claim—

1. In an electric cell, a casing, a positive element, a layer of depolarizing material, an absorbent layer between the said element and material, and a wedge for compressing the said material and forcing it and the said element into intimate contact with the absorbent layer.

2. In an electric cell, a casing, a positive element, a layer of depolarizing material, an absorbent layer between the said element and material, and a wedge-shaped negative element for compressing the said material and forcing it and the said element into intimate contact with the absorbent layer.

Signed at Pittsburgh, Pa., this 18th day of October, A. D. 1913.

FRANK N. MASON.

Witnesses:
ALICE E. DUFF,
F. N. BARBER.